Dec. 1, 1931.  W. F. HOLLINGSWORTH  1,834,242
BRAKE
Filed Sept. 6, 1927  2 Sheets-Sheet 1
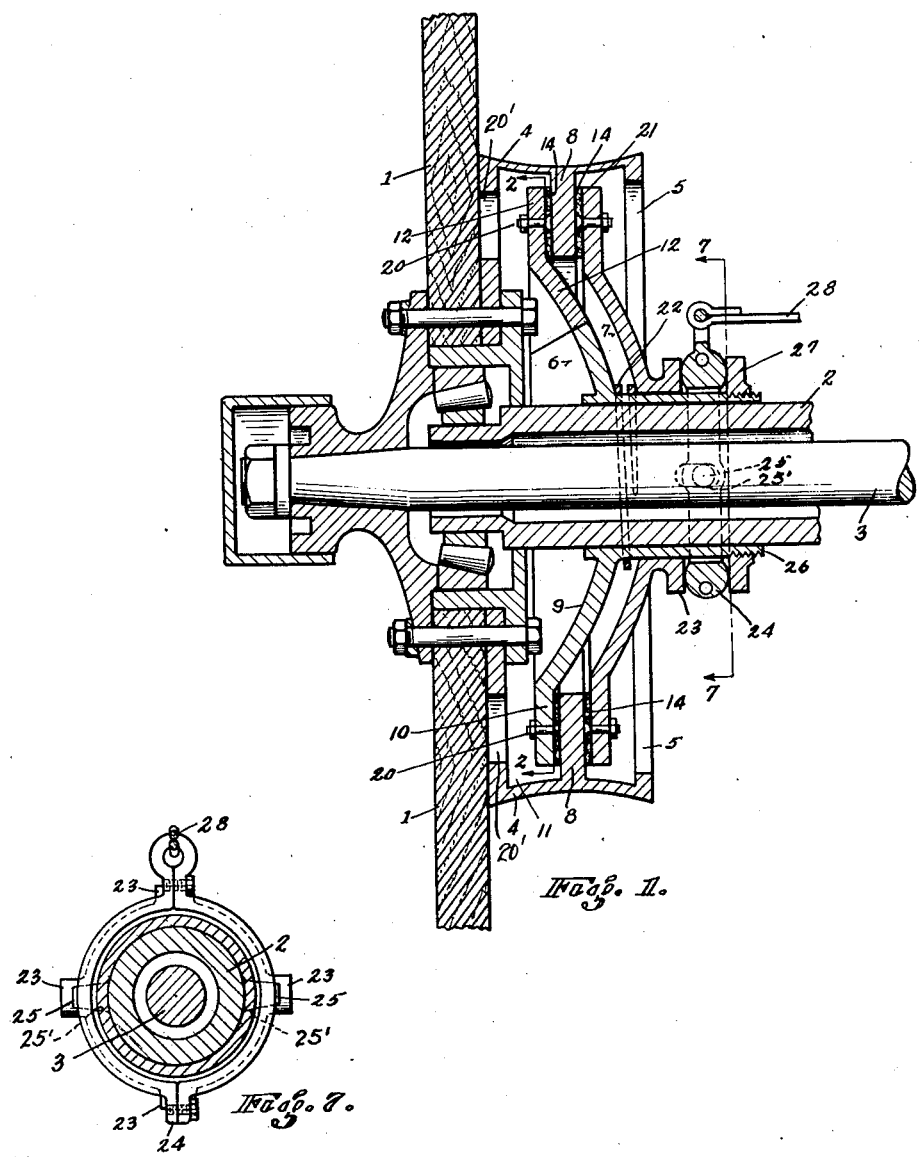
INVENTOR
WILLIAM FAY HOLLINGSWORTH
BY Munn & Co.
ATTORNEYS

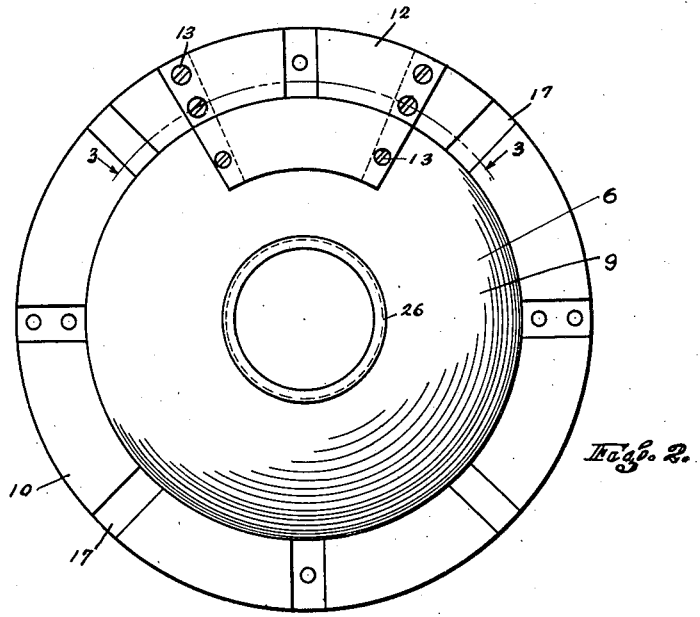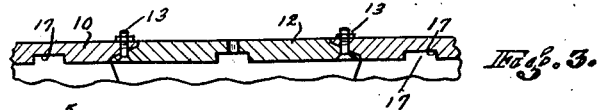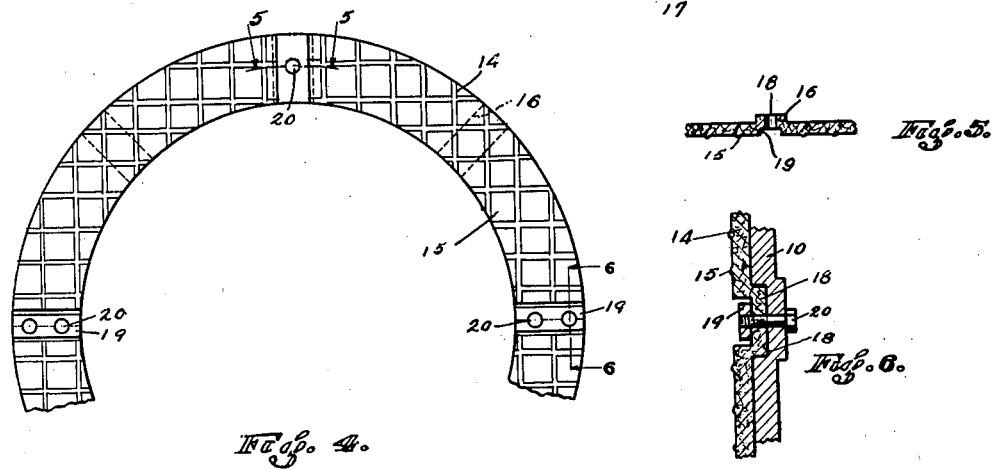

Patented Dec. 1, 1931

1,834,242

UNITED STATES PATENT OFFICE

WILLIAM FAY HOLLINGSWORTH, OF SAN FRANCISCO, CALIFORNIA

BRAKE

Application filed September 6, 1927. Serial No. 217,828.

My invention relates to improvements in brakes and it consists in the combinations, constructions and arrangements hereinafter described and claimed.

An object of my invention is to provide a brake of the disc type which employs two discs that are movable in the direction of their axes, but are not rotatable. These two discs are movable toward each other for gripping a rotatable member, so that the pressure which is exerted by each disc will be equal and there will therefore be no tendency for the brake to move in the direction of its axis when a braking pressure is applied. This type of brake is especially adaptable to automobile wheels because it will not tend to move the wheel along the shaft each time the brake is applied.

A further object of my invention is to provide a device of the type described which is extremely simple in construction and which is durable and efficient for the purposes intended.

Other objects and advantages will appear in the following specification, and the novel features of my invention will be particularly pointed out in the appended claims.

My invention is illustrated in the accompanying drawings forming a part of this application in which:

Figure 1 is a vertical section through the device showing it operatively applied to a wheel.

Figure 2 is a plan view of one of the discs when looking at the disc in the direction of the arrows 2—2 shown in Figure 1.

Figure 3 is a section along the line 3—3 of Figure 2.

Figure 4 is a plan view of a portion of the brake lining employed.

Figures 5 and 6 are views taken along the section lines 5—5 and 6—6 of Figure 4, and Figure 7 is a section along the line 7—7 of Figure 1.

In carrying out my invention I make use of a wheel 1, which is of the usual type, this wheel being mounted upon a housing 2 and being rotated by a shaft 3. The wheel carries a brake drum 4 of the shape shown in Figure 1. This drum has an opening 5 for receiving braking discs 6 and 7 and also has an inwardly extending annular flange 8 against which the discs 6 and 7 are adapted to bear. The discs are prevented from rotating relative to the housing 2 by means hereinafter described.

I will now describe the disc 6, this being shown in Figures 2 to 6 inclusive. The disc 6 has a spherical-shaped portion 9 and a ring-shaped rim 10. The rim 10 is adapted to be received within the compartment 11 (see Figure 1) formed by the rim of the drum 4 and the flange 8. In order to move the rim 10 past the flange 8, I provide a rim section 12 as shown in Figures 2 and 3. This section is large enough to provide an opening in the rim when the section is removed for permitting the rim to be tilted to dispose one end of the split rim beyond the flange 8. The disc 6 may now be rotated for feeding the entire rim past the flange and into the compartment 11. After this is done the section 12 may be secured to the rim 10 by bolts 13 (see Figure 3).

The rim 10 is the only portion that performs the braking action against the flange 8. The surface of the rim disposed adjacent to the flange 8 is provided with brake lining 14 of the construction shown in Figures 4, 5 and 6. This brake lining is in the shape of two half circles having a roughened surface 15 that contacts with the flange 8. The opposite surface of the lining is provided with radially extending projections 16 that are receivable in radially extending grooves 17 in the rim 10 (see Figure 2). Certain of the projections 16 are provided with openings 18 (see Figure 5) and have grooves 19 on the side having the roughened surface. These grooves 19 are deep enough to receive the heads of bolts or rivets 20 that secure the lining 14 to the rim. In this way the lining is secured to the rim and may be removed when worn so that a new lining may be substituted for the old.

It is not necessary to remove the rim 10 from the compartment 11 each time a new lining is secured to the disc 6. The lining is in two semi-circles as heretofore set forth and therefore a removal of the bolts 20 will permit the old lining to be taken out and a new lining disposed in place without removing the disc. Openings 20' are provided in the drum 4 for permitting access to the bolts 20.

The disc 7 is somewhat similar to the disc 6 except that the rim portion 21 is not provided with a removable section similar to the section 12 because this is not needed, the opening 5 being large enough to receive the entire disc. In all other respects the disc 7 is the same as the disc 6 and has a lining 14 secured thereto similar to the lining secured to the disc 6.

The two discs 6 and 7 are kept spaced from the flange 8 by a spring 22. The disc 7 is provided with four or more projections 23 certain of these engaged by a rockable ring 24 which is pivoted to the housing 2 by means of lugs 25. The ring 24 also engages with the sleeve end of the disc 7. The disc 6 has a tubular portion 26 upon which the disc 7 slides and the end of this tubular portion is threaded for receiving a collar 27 which bears against the opposite side of the rockable collar 24.

It will be noted from Figure 7 that the lugs 25 extend through diametrically opposed slots 25' which are fashioned in the tubular portion 26. This construction permits the disc 6 to move along the length of the axle housing, but prevents the former from rotating with respect to the latter.

From the foregoing description of the various parts of the device, the operation thereof may be readily understood.

The rockable collar 24 is connected by a strap 28 to a foot pedal or a lever as the case may be. A movement of the strap 28 will cause the discs 6 and 7 to frictionally engage with the flange 8 and thereby apply a braking action to the drum 4 which will stop the rotation of the wheel. The collar 24 frictionally engages with the projections 23 when the strap 28 is tensioned, and this prevents the disc 7 from rotating with respect to the disc 6. The force exerted by the disc 6 against the flange 8 is exactly balanced by the force exerted by the disc 7, and therefore there will be no tendency of moving the brake drum 4 and the wheel 1 longitudinally on the housing 2 or shaft 3 in either direction. This is the vital feature in applicant's invention.

Although I have shown and described one embodiment of my invention, it is to be understood that the same is susceptible of various changes and I reserve the right to employ such changes as may come within the scope of the appended claims.

I claim:

1. The combination with a wheel and a supporting member for a wheel, a brake drum secured to said wheel, and having an inwardly extending annular flange, a disc having a removable section for permitting the disc to be moved into said brake drum and to bear against the inner surface of said flange, a second disc for bearing against the outer surface of said flange, yielding means for normally keping said discs out of braking engagements with said flange, and means for exerting an equal force on both discs simultaneously for moving said discs into braking contact with said flange.

2. A brake comprising a drum having an inwardly-extending flange, a braking disc disposed on each side of said flange, each disc having a sleeve, the sleeve of one disc sliding freely upon the sleeve of the other, a spring for urging said discs away from each other, and manually-controlled means for moving both of said discs simultaneously for bringing them into frictional contact with said flange.

3. A brake comprising a drum having an integral flange, a braking disc disposed on each side of said flange, each disc having a sleeve, the sleeve of one disc sliding freely upon the sleeve of the other, and manually-controlled means for moving both of said discs an equal distance simultaneously and for bringing them into frictional contact with said flange.

4. In a brake, a cylindrical brake drum having an inwardly extending flange, a disc having a rim adapted to bear against said flange, said disc having a removable section, said disc being adapted to pass through the inner circumference of said flange when said section is removed.

5. A brake comprising a drum having an integral flange, a braking disc disposed on each side of said flange, each disc having a sleeve, the sleeve of one disc sliding freely upon the sleeve of the other, manually controlled means for moving said discs toward each other, said means including a rockable ring pivoted to a housing for causing equal and simultaneous movements of said discs when said rockable ring is actuated for bringing said discs into frictional contact with said flange.

WILLIAM FAY HOLLINGSWORTH.